April 7, 1970     H. R. TRAHMS     3,504,646
NITROGEN KNIFE

Filed Nov. 15, 1967     2 Sheets-Sheet 1

INVENTOR.
HAROLD R. TRAHMS
BY
Merchant & Gould
ATTORNEYS

April 7, 1970  H. R. TRAHMS  3,504,646
NITROGEN KNIFE

Filed Nov. 15, 1967  2 Sheets-Sheet 2

INVENTOR.
HAROLD R. TRAHMS
BY
Merchant & Gould
ATTORNEYS

United States Patent Office 3,504,646
Patented Apr. 7, 1970

3,504,646
NITROGEN KNIFE
Harold R. Trahms, Janesville, Minn. 56048
Filed Nov. 15, 1967, Ser. No. 683,173
Int. Cl. A01b 15/16; A01c 23/02
U.S. Cl. 111—7
3 Claims

ABSTRACT OF THE DISCLOSURE

Apparatus including a coulter for forming a vertical trench in the soil, a fixedly positioned gouge extending transversely outwardly away from the coulter for forming a generally horizontal trench spaced beneath the surface of the soil, and a supply of liquid or gaseous nitrogen, including pure nitrogen and/or nitrogenous compounds, having conduit means extending to a position behind the knife edge for introducing the nitrogen directly into the soil adjacent the horizontal trench. The apparatus further includes valve means for controlling the flow of nitrogen and for preventing the flow of nitrogen from the supply when the nitrogen knife is disengaged from the soil.

BACKGROUND OF THE INVENTION

Field of the invention

In farming and related production of agricultural products it is common practice to introduce nitrogen into the soil by applying a nitrogenous compound, such as anhydrous ammonia, liquid ammonia, or other gaseous or liquid nitrogen containing solutions, directly to the soil. The nitrogenous compounds or solutions become fixed in the soil and are utilized by many plants and crops in a manner well known to those skilled in the art.

Description of the prior art

In the prior art devices nitrogenous compounds and solutions are introduced into the soil by simply extending a conduit from a supply tank below the surface of the soil behind a cultivator or the like. These methods and the apparatus utilized therein are unsatisfactory because a substantial quantity of the nitrogenous compounds are lost if the gaseous forms are being utilized. Further, in some of these prior art apparatus particular forms of nitrogenous compounds have a tendency to produce frost, which by itself or in combination with the soil, can obstruct the flow of the nitrogenous compounds or increase the loss thereof because of the soil freezing onto the machinery and increasing the size of the trench into which the compound is introduced.

SUMMARY OF THE INVENTION

The present invention pertains to a nitrogen knife for introducing liquid or gaseous nitrogen and/or nitrogenous compounds or solutions directly into the soil comprising a coulter mounted to fo rm a generally vertical trench in the soil, a knife edge mounted to extend transversely outwardly away from said coulter below the surface of the soil for forming a generally horizontal trench spaced below the surface of the soil, and conduit means in communication with a supply of nitrogen and having outlet means adjacent said knife edge for introducing nitrogen into the generally horizontal trench.

It is an object of the present invention to provide new and improved apparatus for introducing liquid and/or gaseous nitrogen, in the pure form and/or in a nitrogenous compound, directly into the soil.

It is a further object of the present invention to provide apparatus for introducing nitrogen into the soil so that less nitrogen is lost in the process.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures.

DESCRIPTION OF THE PREFERRED EMBODIMENTS

Figure 1:
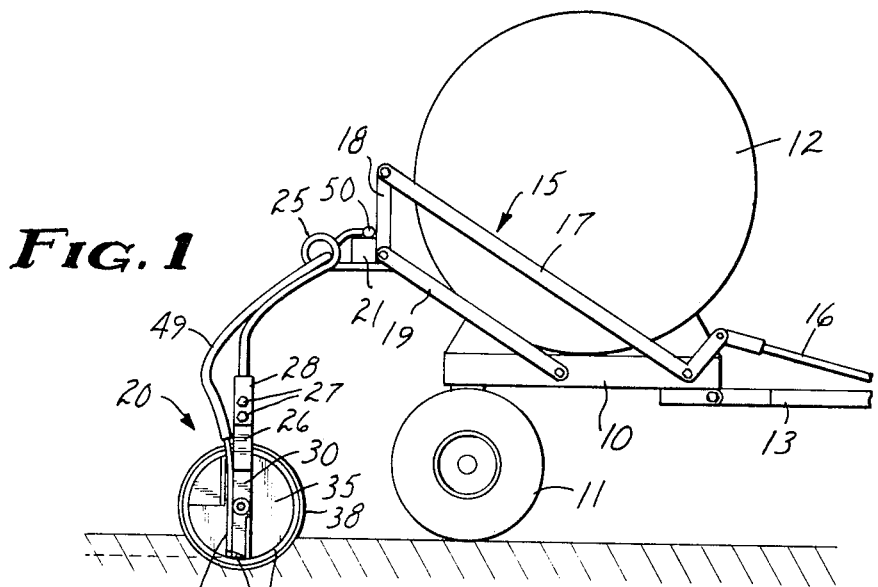
FIGURE 1 is a view in side elevation of the present invention.
Figure 2:
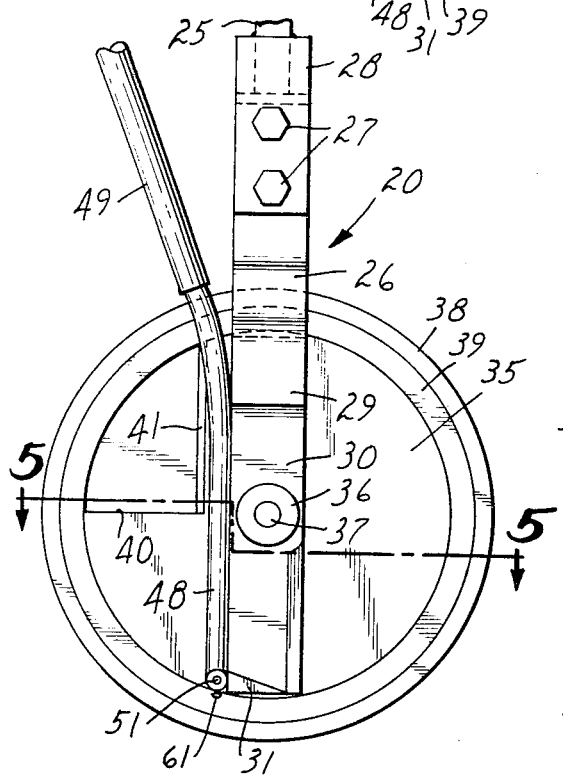
FIGURE 2 is an enlarged side elevational view in detail of the apparatus for introducing the nitrogen into the soil.
Figure 3:
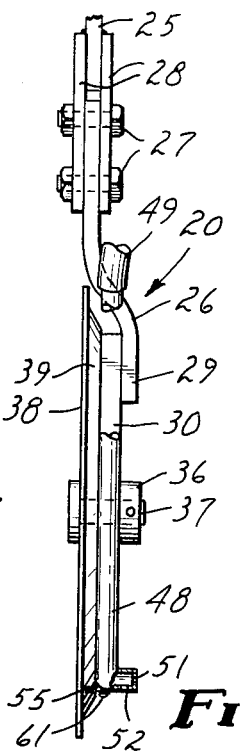
FIGURE 3 is a rear view of the apparatus as seen from the left side of FIGURE 2.
Figure 4:
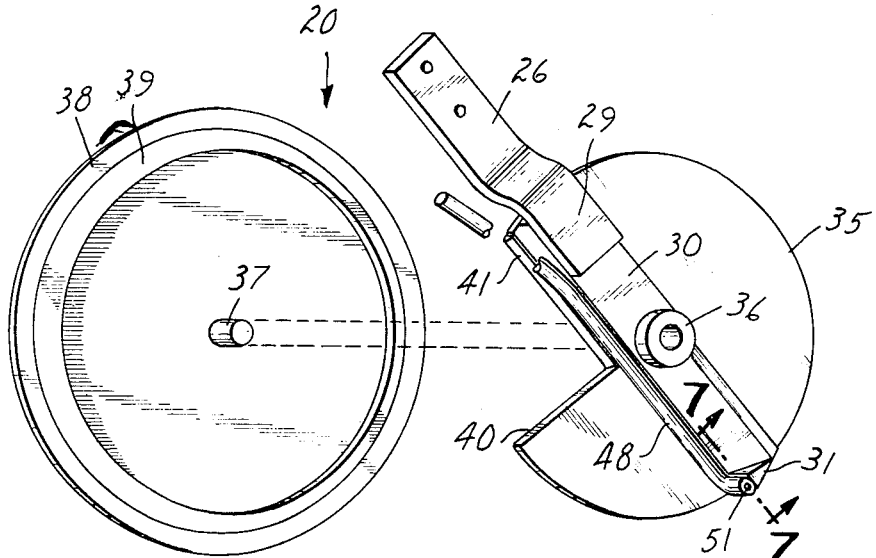
FIGURE 4 is an exploded view in perspective of the apparatus illustrated in FIGURE 2.
Figure 5:
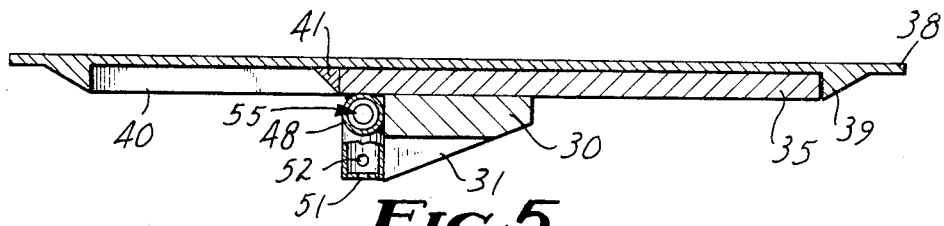
FIGURE 5 is an enlarged sectional view as seen from the line 5—5 in FIGURE 2, parts thereof broken away.
Figure 6:
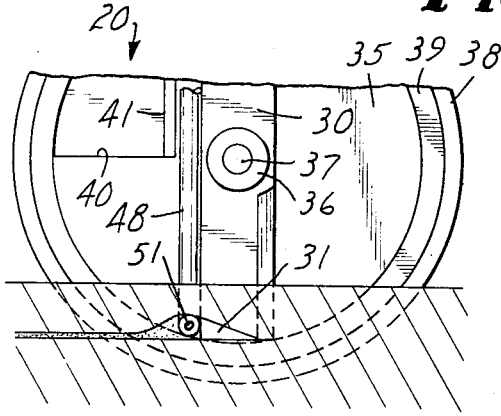
FIGURE 6 is an enlarged view similar to FIGURE 2 illustrating the apparatus engaged in the soil, parts thereof broken away.
Figure 7:
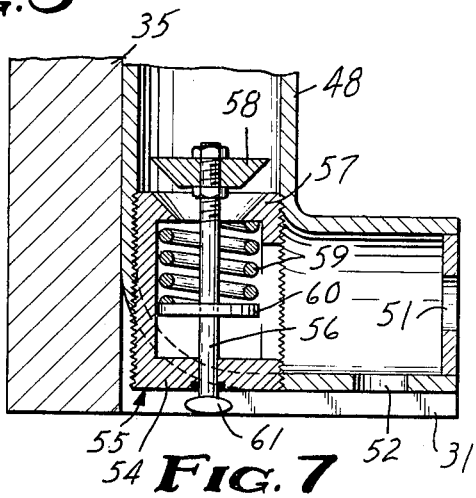
FIGURE 7 is a greatly enlarged sectional view as seen from the line 7—7 in FIGURE 5.

In FIGURE 1 a frame 10 is supported for movement across the soil by wheels 11 and has a reservoir or tank 12 mounted thereon. The frame 10 is adapted to be attached to a tractor or other vehicle by a draw bar 13. A lifting mechanism generally designated 15 is pivotally attached to either side of the frame 10 (only one of which is illustrated) and has an actuating arm 16 extending forwardly toward the draft vehicle so that the lifting mechanism 15 may be operated therefrom. The lifting mechanism 15 includes an L-shaped rod 17 pivotally attached at the junction of the two arms to the frame 10 with the end of the smaller arm pivotally attached to the end of the actuating arm 16 and the end of the longer arm extending rearwardly and pivotally attached to a generally vertical member 18. A second rod 19 is pivotally attached at one end to the frame 10 rearwardly of the connection of the L-shaped rod 17 and extends upwardly and rearwardly to the vertical member 18 generally parallel with the long arm of the L-shaped rod 17. The rearmost end of the rod 19 is pivotally attached to the vertical member 18 somewhat below the attachment of the L-shaped rod 17 so that movement of the actuating arm 16 produces pivotal movement of the rods 17 and 19 and consequent vertical movement of the vertical member 18. An elongated bar 21 extends horizontally between the vertical member 18 approximately transverse to the direction of movement. It should be understood that the described frame 10 and lifting mechanism 15 are simply for explanatory purposes and any mechanism which performs the functions of this invention might be utilized. In some situations it may be desirable to utilize the frame of existing machinery.

A plurality of nitrogen knives, each generally designated 20 (only one of which can be seen), are attached to the bar 21 for engagement with the soil when the vertical member 18 is lowered and for disengagement from the soil when the vertical member 18 is raised. A single nitrogen knife 20 will be described in conjunction with the FIGURES 2 through 6 but it should be understood that a plurality of nitrogen knives 20 may and generally will be utilized on any single frame 10.

A spring steel rod 25 having one complete helical turn therein to provide spring action is attached to the vertical member 18 and extends rearwardly and downwardly therefrom. The rearmost end of the rod 25 is positioned generally vertical and has attached thereto a flat member 26 by some convenient means, such as bolts 27 and parallel opposed clamping plates 28. The flat member 26 is bent so that a lower flat portion 29 thereof is offset horizontally from the upper portion, which is attached to the end of the rod 25. An elongated flat bar 30 is affixed to the inner surface of the lower portion 29 of the flat member 26, by some means such as welding or the like, so as to extend vertically downwardly therefrom generally below the main portion of the flat member 26 and the vertical portion of the rod 25. The lower end of the flat bar 30 has a gouging means 31 extending generally horizontally outwardly therefrom. The gouging means 31 consists of a generally pyramid shaped member positioned with the base extending rearwardly the lower side positioned generally horizontally and the inner side positioned in flat abutting engagement with the outer surface of the flat bar 30. The gouging means 31 may be affixed to the flat bar 30 by any convenient means, such as welding or the like, and the forwardmost outer vertical edge of the flat bar 30, which extends upwardly from adjacent the point of the gouging means 31, is bevelled so that the flat bar 30 will slide through the soil relatively easily. The gouging means 31 is adapted to form a generally horizontal trench spaced below the surface of the soil as the nitrogen knife 20 is moved horizontally therealong.

A disk shaped filler plate 35 is fixedly attached to the inner surface of the flat bar 30 opposite the gouging means 31 so as to extend substantially vertically below the upper portion of the flat member 26 and in a plane generally parallel with the direction of movement of the frame 10. The filler plate 35 is attached to the flat bar 30 by some convenient means, such as welding or the like, and the diameter is slightly greater than the length of the flat bar 30 so that the filler plate 35 extends vertically outwardly from either end thereof. The filler plate 35 and flat bar 30 have an opening therethrough and the flat bar 30 has a hub 36 fixedly attached thereto adapted to receive an axle 37 therein. A generally disk shaped coulter 38 is mounted for rotation on the axle 37 immediately adjacent the filler plate 35. A ring 39, having an outer diameter slightly smaller than the coulter 38, is coaxially attached to one surface of the coulter 38 by some convenient means, such as welding or the like. The thickness of the ring 39 is approximately equal to the thickness of the filler plate 35 and has an inside diameter slightly larger than the outside diameter of the filler plate 35 so the coulter 38 and ring 39 can rotate on the axle 37 with respect to the filler plate 35. The periphery of the ring 39 is bevelled so that it slants radially outwardly toward the coulter 38 to provide a sharpened periphery and enhance the movement through the soil.

A wedge shaped portion is removed from the filler plate 35 to provide a self-cleaning action for the coulter 38. One edge 40 of the wedge shaped portion extends generally horizontally and along a rearwardly extending radius of the filler plate 35. A second edge 41 of the wedge shaped portion extends vertically upwardly generally parallel with but spaced from the edge of the flat bar 30. The edge 41 is tapered inwardly to form a sharp edge adjacent the coulter 38, which produces a scraping or cutting action to remove soil packed or frozen onto the coulter 38. Thus, the filler plate 35 serves to support the coulter 38 while the edge 41 of the wedge shaped portion removed therefrom serves to clean soil from the coulter 38.

A rigid conduit 48 is attached to the rear edge of the flat bar 30 and extends vertically therealong to approximately the lower end thereof where it is bent outwardly to extend along the rear edge of the gouging means 31. The conduit 48 has attached thereto a flexible conduit 49 which extends upwardly and is in communication with an elongated generally horizontal pipe 50. The pipe 50 extends the length of the bar 21 on the lifting mechanism 15 and is in communication with all of the flexible conduits 49 on the various nitrogen knives 20. The pipe 50 is also in communication with the tank 12 through conduit means not shown. The extreme outer end of the conduit 48 has a restricted opening 51 therethrough to allow the flow of material from the conduit 48 outwardly into the trench formed by the gouging means 31. It should be understood that any number of openings may be formed in the conduit 48 and these openings may be placed in a variety of positions. For example, a second restricted opening 52 is shown in the bottom of the horizontal portion of the conduit 48 to allow material to flow downwardly to the bottom of the trench formed by the gouging means 31. In some instances and for particular material it may be desirable to have the conduit 48 simply end in an unrestricted opening. It should be understood that the variety of means, some of which have been described, for distributing the material contained in the conduit 48 all come within the scope of this invention if they perform the functions described herein.

A valve generally designated 55 is illustrated in the lower end of the vertical portion of conduit 48. The valve 55 includes a cylindrical housing 54 having the outer periphery thereof threaded and a plunger 56 extending axially through the bottom wall of the housing 54 and through a valve seat 57 formed within the upper wall of the housing 54. The plunger 56 has a widened portion 58 attached to the upper end thereof, which portion 58 is adapted to mate with the valve seat 57 and close the valve 55 and conduit 48. The plunger 56 further has a compression spring 59 engaged coaxially therearound between the lower surface of the valve seat 57 and a shoulder 60. The spring 59 biases the plunger 56 downwardly to maintain the valve 55 closed when the nitrogen knife 20 is disengaged from the soil. The lower end of the plunger 56 extending through the housing 54 has a shoe 61 thereon, which shoe is adapted to bear against the soil when the nitrogen knife is engaged in the soil and force the plunger 56 upwardly to open the valve 55 and allow material to flow through the valve 55 and the conduit 48. The entire valve 55 and the conduit 48 are adapted to be threadedly engaged for easy installation and maintenance. It should be understood that the valve 55 illustrated is only for explanatory purposes and a variety of valves might be utilized by those skilled in the art. One such valve which might be utilized could be positioned at the tank 12 and operated by the actuating arm 16 so that material would flow from the tank 12 into the pipe 50 when the actuating arm 16 lowers the nitrogen knives 20 and the flow of material from the tank 12 is stopped when the actuating arm 16 raises the nitrogen knives 20.

In the operation of the present invention the tank 12 contains nitrogen or nitrogenous compounds in the liquid or gaseous state. It should be understood that throughout this application the term nitrogen is utilized to indicate any material containing nitrogen, whether it is nitrogen in the liquid or gaseous state or some nitrogenous compound or solution. The nitrogen within the tank 12 is conveyed to the flexible conduit 49 through the pipe 50 and its connections. The nitrogen from the tank 12 may be forced, through the use of a pump or the like, into the pipe 50 under pressure or, under certain circumstances, the nitrogen may simply be allowed to flow from the tank 12 into the pipe 50 and through the flexible conduit 49. As the nitrogen knife 20 is lowered by the actuating arm 16 the coulter 38 forms a vertical trench in the soil and the gouging means 31 forms a horizontal trench in the soil spaced below the surface thereof. Nitrogen flows from the conduit 48 through the opening 51 and/or the opening 52 into the horizontal trench. The vertical trench formed by the coulter 38 closes as the nitrogen knife 20 moves over the surface of the soil and the nitrogen distributed in the horizontal trench remains in the soil. It has been noted that in some instances, especially when using anhydrous ammonia, frost is produced around the conduit 48, gouging means 31 and coulter 38. The present apparatus substantially reduces this frost problem by maintaining the nitrogen under approximately the same pressure as is prevalent in tank 12 until it leaves the restricted openings 51 and/or 52. Thus, by restricting the openings 51 and 52 the nitrogen remains under pressure until it is clear of the apparatus, at which time the formation of frost produces no problems. Further, through experimentation it has been found that placing the openings 51 and 52 adjacent the side and bottom walls of the horizontal trench causes the nitrogen leaving the openings 51 and 52 to pass through a small amount of soil before entering the horizontal trench at which time the nitrogen has either warmed slightly or the apparatus has passed by so that frost will not form thereon.

What is claimed is:

1. A nitrogen knife for introducing liquid and gaseous nitrogen and nitrogenous compounds directly into the soil comprising:
    (a) a frame adapted to be transported over the soil;
    (b) a reservoir mounted on said frame and adapted to contain a supply of nitrogen;
    (c) a disk coulter operatively attached to said frame for forming a generally vertical trench in the soil;
    (d) gouging means attached to said frame and extending transversely outwardly away from said disk coulter below the surface of the soil for forming a generally horizontal trench in communication with said vertical trench and spaced below the surface of the soil; and
    (e) conduit means in communication with said reservoir and having outlet means extending under the surface of the soil and along a rear surface of said gouging means to substantially the outermost surface thereof, said conduit means terminating in at least one restricted opening for maintaining pressure within said conduit means and for introducing nitrogen from said reservoir into the soil bordering the generally horizontal trench.

2. A nitrogen knife as set forth in claim 1 having in addition valve means within said conduit means for controlling the flow of nitrogen within said conduit means and substantially preventing the flow of nitrogen when said nitrogen knife is disengaged from the soil.

3. A nitrogen knife as set forth in claim 1 having in addition means affixed to the frame adjacent the coulter for removing soil from said coulter and preventing the build-up of soil thereon with the subsequent increase in the width of the vertical trench.

References Cited

UNITED STATES PATENTS

| | | | |
|---|---|---|---|
| 711,626 | 10/1902 | Heath et al. | 111—87 |
| 826,079 | 7/1906 | Aikele | 111—87 XR |
| 2,904,119 | 9/1959 | Hunter | 111—7 XR |
| 2,912,944 | 11/1959 | Snow et al. | 111—7 |
| 2,988,026 | 6/1961 | Heckathorn | 111—7 |
| 3,077,166 | 2/1963 | Delp | 111—7.3 |
| 3,211,114 | 10/1965 | Ucinhaska | 111—7 |

ROBERT E. BAGWILL, Primary Examiner

U.S. Cl. X.R.

111—87; 172—558